United States Patent
Cook

(10) Patent No.: US 8,507,866 B2
(45) Date of Patent: Aug. 13, 2013

(54) COLD-SHIELDED INFRARED DISPERSIVE SPECTROMETER WITH ALL AMBIENT OPTICS

(75) Inventor: Lacy G. Cook, El Segundo, CA (US)

(73) Assignee: Raytheon Company, Waltham, MA (US)

(*) Notice: Subject to any disclaimer, the term of this patent is extended or adjusted under 35 U.S.C. 154(b) by 4 days.

(21) Appl. No.: 13/324,167

(22) Filed: Dec. 13, 2011

(65) Prior Publication Data

US 2013/0146771 A1    Jun. 13, 2013

(51) Int. Cl.
*G01J 3/28* (2006.01)

(52) U.S. Cl.
USPC ............. 250/339.07; 250/483.1; 250/339.11; 250/338.1; 250/339.01; 250/342

(58) Field of Classification Search
USPC ...................................... 250/339.07
See application file for complete search history.

(56) References Cited

U.S. PATENT DOCUMENTS

| | | | |
|---|---|---|---|
| 5,534,700 A | | 7/1996 | McGlynn et al. |
| 6,122,051 A | * | 9/2000 | Ansley et al. .................. 356/326 |
| 6,310,347 B1 | | 10/2001 | Shu et al. |
| 7,041,979 B2 | * | 5/2006 | Chrisp ..................... 250/339.07 |
| 7,703,932 B2 | * | 4/2010 | Cook ............................ 359/858 |
| 2008/0266687 A1 | * | 10/2008 | Cook ............................ 359/859 |
| 2010/0053609 A1 | * | 3/2010 | Chrisp .......................... 356/328 |
| 2011/0267615 A1 | | 11/2011 | Cook |
| 2012/0062889 A1 | * | 3/2012 | Chrisp et al. .................. 356/328 |

* cited by examiner

*Primary Examiner* — David Porta
*Assistant Examiner* — Djura Malevic
(74) *Attorney, Agent, or Firm* — Lando & Anastasi, LLP

(57) ABSTRACT

A dispersive infrared spectrometer in which only a minimum number of optical components, for example, the detector sub-system only, are housed within a cold/cryogenic dewar and the remaining optical components are at ambient temperature during operation of the spectrometer. In one example, the spectrometer includes a slit substrate with a highly reflective surface, and the optical components of the spectrometer are configured and arranged such that for all in-band wavelengths, substantially all off-slit optical paths in the detector field of view are retro-reflected off the reflective surface of the slit substrate into the cryogenic dewar.

15 Claims, 3 Drawing Sheets

COLD-SHIELDED INFRARED DISPERSIVE SPECTROMETER WITH ALL AMBIENT OPTICS

BACKGROUND

Dispersive spectrometers generate spectra by optically dispersing the incoming radiation into its frequency or spectral components, using a dispersive element such as a prism or grating. The spectrometer uses a narrow slit to isolate a beam of photons having a particular wavelength that is incident on and dispersed by the dispersive element and then detected by a detector. Conventional dispersive infrared spectrometers have at least a portion of their optical path and optical elements inside a cold cryogenic, vacuum-sealed ("cryo-vac") dewar to reduce thermally-generated background noise in the measurements. This is because the detector is capable of "seeing" off the slit at other in-band wavelengths that are dispersed by the dispersive element. This ability to see off the slit would contribute to unacceptably high background noise on the detector and compromise performance of the spectrometer if a warm or highly emissive object were in the optical path of the detector. Therefore, the optical components on the detector side of the slit (including the detector itself) are typically placed with the cryo-vac dewar to keep the components cold and reduce thermal noise.

SUMMARY OF INVENTION

As discussed above, placing the optical path from the slit to the detector of a dispersive spectrometer inside a cold, cryo-vac dewar reduces thermal noise. However, this approach has numerous disadvantages. For example, the more optical components that need to be accommodated within the cryo-vac dewar, larger the dewar, the greater the heat load on the refrigeration unit, the longer it takes for the spectrometer system to reach its operating temperature, and the greater the chance for optical misalignment (due to the large temperature difference between the system's on state and its off state). Aspects and embodiments are directed to an optical system and dispersive spectrometer in which only a minimum number of the optical components, for example, the detector element(s) only, are housed within a cold dewar and the remaining optical components are at ambient temperature.

According to one embodiment, a dispersive infrared spectrometer comprises a substrate defining at least one slit, the substrate having a first reflective surface, telecentric flat-field foreoptics configured to direct light rays through the at least one slit, and a telecentric flat-field collimator positioned facing the first reflective surface of the substrate and configured to collimate the light rays from the at least one slit to provide collimated light rays. The dispersive infrared spectrometer further comprises a dispersive element optically coupled to the telecentric flat-field collimator, the telecentric flat-field collimator being positioned between the substrate and the dispersive element, the dispersive element configured to receive and spectrally disperse the collimated light rays to provide dispersed light, a detector housed within a cryogenic dewar, and a flat-field relayed imager positioned between the dispersive element and the detector and configured to receive the dispersed light from the dispersive element and to image the dispersed light onto the detector, wherein the substrate, the telecentric flat-field foreoptics, the dispersive element, the telecentric flat-field collimator and the flat-field relayed imager are located outside the cryogenic dewar and, during operation of the spectrometer, are at ambient temperature.

In one example of the dispersive infrared spectrometer the detector is a two-dimensional focal plane array sensor. The dispersive element may be a diffraction grating or prism, for example. In one example, the first reflective surface of the substrate is substantially planar. The first reflective surface of the substrate may provide a narcissus mirror configured to retro-reflect substantially all in-band wavelengths of light to the detector. In one example, the in-band wavelengths include wavelengths in a range of approximately 8 to 12 micrometers. In another example, the telecentric flat-field foreoptics includes a primary mirror configured to receive incident light rays and to reflect the light rays, a secondary mirror optically coupled to the primary mirror and configured to receive the light rays reflected from the primary mirror and to reflect the light rays, and a tertiary mirror optically coupled to the secondary mirror and configured to receive the light rays reflected from the secondary mirror and to reflect and focus the light rays at the at least one slit in the substrate. In another example, the telecentric flat-field collimator is configured to collimate the light rays into a circular beam that is incident on the dispersive element.

According to another embodiment, a method of controlling thermal noise in an infrared spectrometer comprises acts of providing a cryogenic dewar containing a detector, providing a substrate defining at least one slit and having a planar reflective mirror surface, the substrate being located outside of the cryogenic dewar, and from the reflective mirror surface, retro-reflecting a field of view of the detector through a dispersive element and a telecentric collimator positioned between the substrate and the dispersive element into the cryogenic dewar, the dispersive element and the telecentric collimator being located outside of the cryogenic dewar.

In one example of the method retro-reflecting the field of view of the detector includes retro-reflecting light in the long-wavelength infrared spectral band. The method may further comprise focusing light rays at the at least one slit using telecentric foreoptics, collimating the light rays from the slit with the telecentric collimator to provide a collimated beam, and directing the collimated beam to the dispersive element, and spectrally dispersing the collimated beam over the detector. In one example spectrally dispersing the collimated beam includes providing spectrally dispersed light, and the method further comprises reimaging the spectrally dispersed light from the dispersive element with a relayed imager located outside of the cryogenic dewar and directed the spectrally dispersed light to the detector. In another example, spectrally dispersing the collimated beam includes spectrally dispersing the collimated beam with a diffraction grating. In another example, retro-reflecting the field of view of the detector includes retro-reflecting substantially all images of the detector in wavelengths within a spectral bandpass of the infrared spectrometer as formed through the dispersive element.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a dispersive infrared spectrometer in which only a minimum number of the optical components, for example, the detector subsystem only, are housed within a cold/cryogenic dewar and the remaining optical components are at ambient temperature. As discussed in more detail below, an arrangement of the optical path and configuration of the optical components is selected such that for substantially all in-band wavelengths, the field of view of the detector is retro-reflected back into the dewar and therefore does not "see" warm (or ambient) components with high emissivity that could contribute significantly to infrared background noise. This may be achieved using telecentric foreoptics and telecentric collimating optics together with a slit substrate that has a polished, planar reflective surface to provide a "narcissus" mirror that retro-reflects the field of view of the detector through the dispersive element (e.g., a grating or prism) and collimating optics back into the dewar, as discussed below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
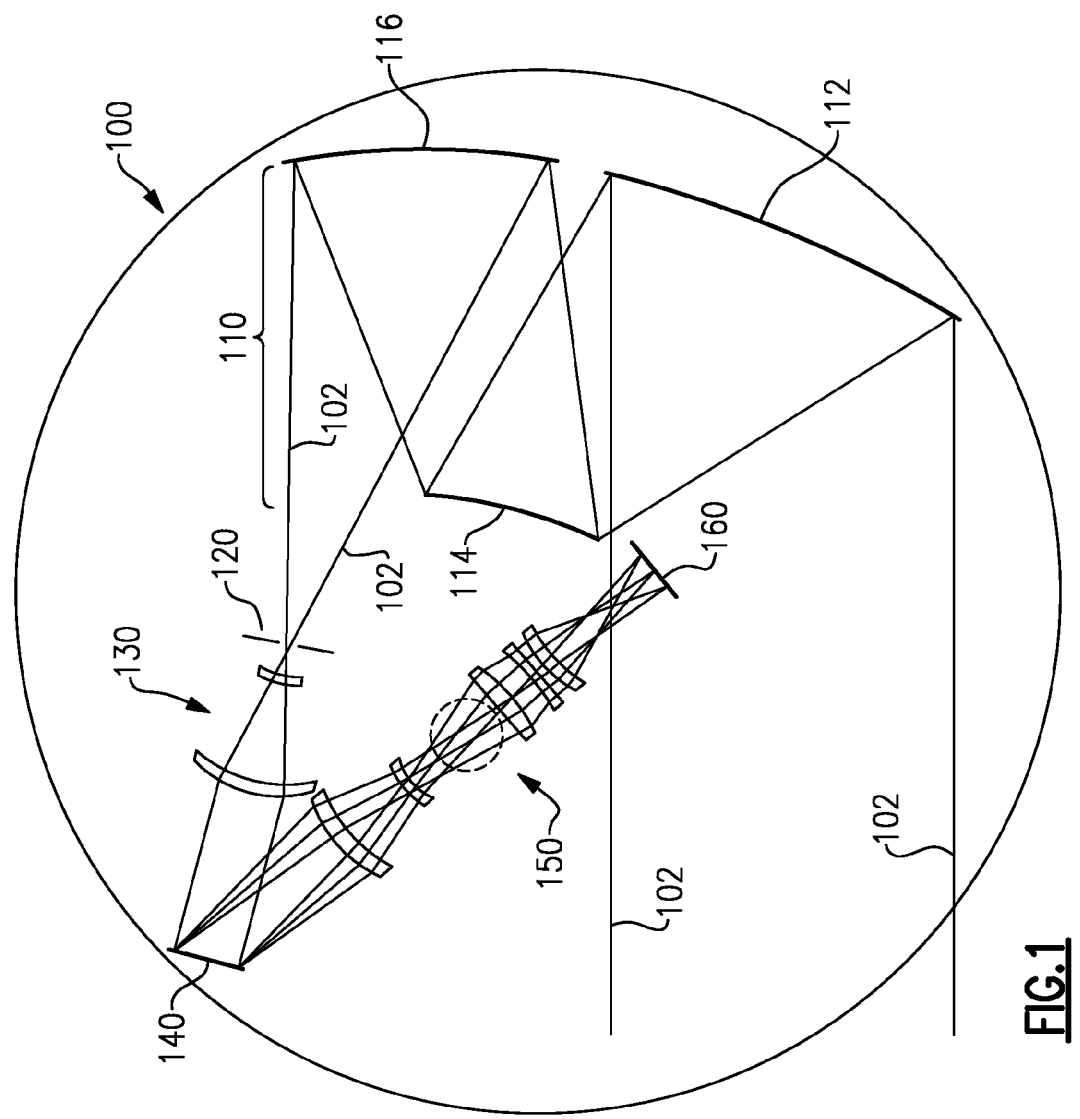
FIG. 1 is a schematic diagram of one example of a dispersive interferometer according to aspects of the invention.

Referring to FIG. 1, there is illustrated a schematic diagram of one example of the optical path of a dispersive spectrometer 100, in accordance with an embodiment. In one example, the spectrometer 100 is an infrared dispersive spectrometer. The spectrometer 100 includes foreoptics 110, a slit substrate 120 that defines one or more slits therein, a collimator optic 130, a dispersive element 140, a relayed imager optic 150, and a detector 160. The detector 160 is housed in a cold cryo-vac dewar (not shown), while the relayed imager 150, dispersive element 140 and collimator 130 may be located outside the dewar and at ambient temperature, as discussed further below. The slit may be an "air slit" line cut or etched into an otherwise opaque (for example, metal or glass) substrate 120. Alternatively, the slit may be defined by a line break in a metal or dielectric coating deposited onto an otherwise transparent (e.g., glass) substrate 120.

In one embodiment, the foreoptics 110 are telecentric flat-field foreoptics, including a primary mirror 112, a secondary mirror 114 and a tertiary mirror 116. The telecentric flat-field foreoptics 110 direct incoming light rays 102 to the slit substrate 120. The foreoptics 110 image a distant scene onto the slit in the slit substrate 120. There are numerous suitable configurations of the foreoptics 110 which may be used in various embodiments, and the configuration of the foreoptics may be selected, for example, based on the application, spectrometer specifications, or other considerations, provided only that the foreoptics 110 be telecentric and flat-field. The light rays 102 pass from the foreoptics 110 through the slit(s) in the slit substrate 120 and are collimated by the collimator optic 130 before being incident on the dispersive element 140. The collimator optic 130 is a telecentric flat-field collimator having an oversized two-dimensional field of view. In one example, the collimator optic 130 receives the output from the slit in the slit substrate 120 and collimates the light rays into a circular beam that is incident on the dispersive element 140. The dispersive element 140 may be a prism or grating, such as a diffraction grating, for example. The relayed imager optic 150 is a flat-field imager comprising a plurality of optically coupled lenses and directs the dispersed light from the dispersive element to the detector 160.

Figure 2:
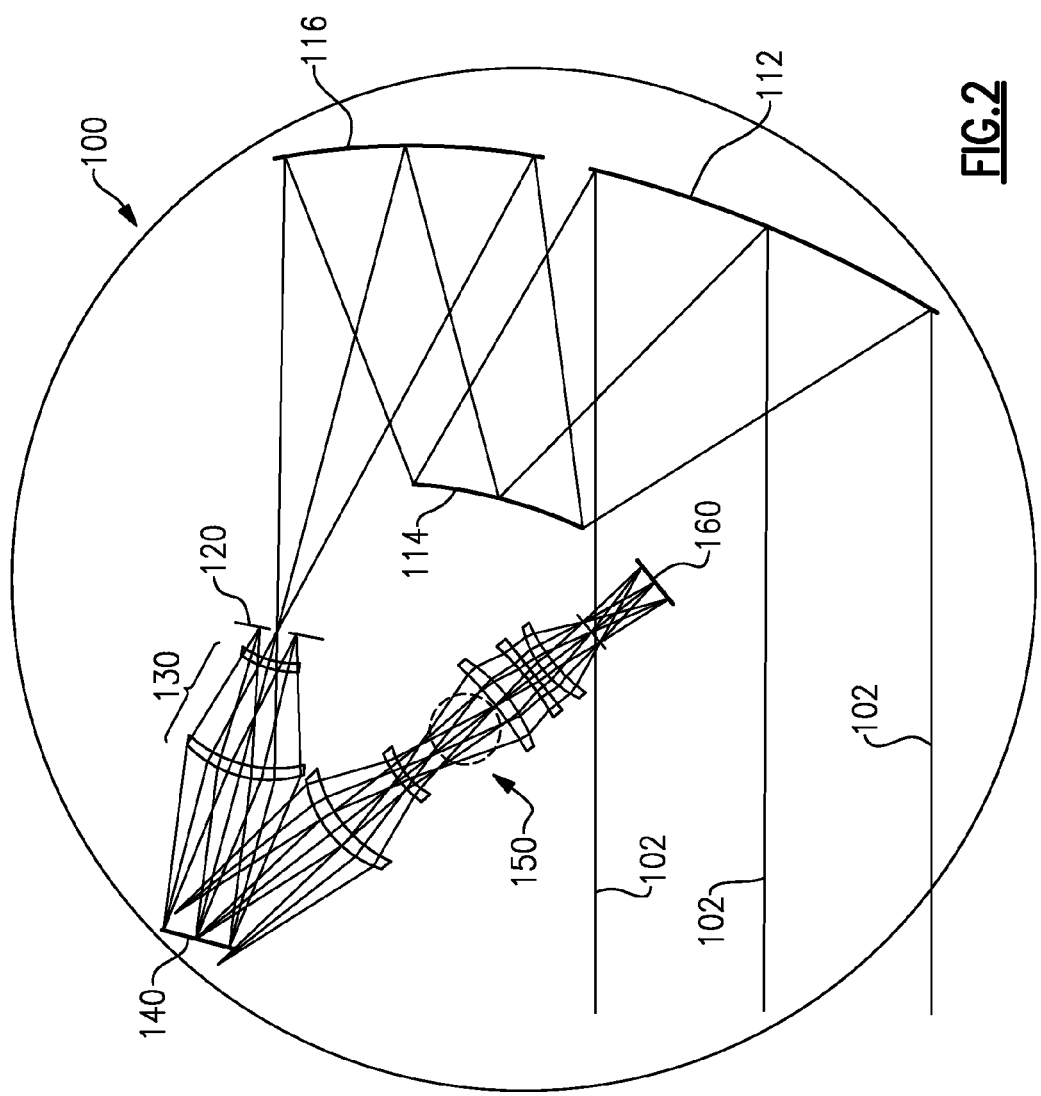
FIG. 2 is a schematic diagram of another example of a dispersive interferometer according to aspects of the invention.

Thus, light 102 is focused at the slit in the slit substrate 120 and spectrally dispersed by the dispersive element 140 over the focal plane of the detector 160. In one example, the detector 160 is a two-dimensional focal plane array detector. The light rays 102 are spectrally dispersed over the focal plane array in one dimension, and in the other dimension is an image of the slit. At particular wavelengths of interest, the optical path lies between the detector 160 and the slit. However, as discussed above, the detector 160 may be able to see "off slit." For example, the detector 160 may "see" other in-band wavelengths at different angles. Referring to FIG. 2, the detector 160 (or certain pixels thereof) may "look" back through the grating at all in-band wavelengths and see the slit substrate 120. As these off-slit paths may contribute to background noise, particularly in infrared spectrometer systems, conventionally all optical components on the detector side of the slit are housed within a cold dewar to reduce thermal noise. In contrast, according to certain aspects and embodiments, the optical components and optical path of the spectrometer 100 are configured and arranged such that the off-slit paths retro-reflect back into the cold dewar housing the detector 160. Thus, the intended wavelength for a particular detector goes through the slit in the slit substrate 120 while all other wavelengths "see" the reflective substrate 120 and are retro-reflected back into the dewar, as discussed further below. As a result, thermal noise is greatly reduced without the need to place other the optical components inside a cold dewar. This ability to have the majority of the spectrometer optical components at ambient temperature represents a significant benefit and improvement in terms of the cost and complexity of the spectrometer system, as discussed further below.

According to one embodiment, the slit substrate 120 is oversized, meaning that it is substantially larger than the minimum dimension needed to accommodate the slit or slits. In addition, in one embodiment, the slit substrate 120, and the collimator optic 130 field of view, are large enough to retro-reflect all images of the detector 160 in all wavelengths within the spectral bandpass of the spectrometer, as formed through the dispersive element 140. Thus, the slit substrate 120 may be sized to capture substantially all off-slit optical paths to and from the detector 160. In addition, the substrate surface facing the collimator optic 130 is substantially flat and planar and is polished to form a highly reflective mirror surface. The combination of the reflective substrate surface, the telecentric foreoptics 110, telecentric collimator 130 and flat-field relayed imager optic 150 is configured to re-image the view of the detector 160 off the slit substrate 120 back into the cold dewar housing the detector. Thus, the flat, reflective surface of the slit substrate 120 forms a "narcissus" mirror that reflects the off-slit in-band view of the detector 160 back onto cold surfaces within the cryogenic dewar. In one example, the telecentric collimator optic 130 is configured with a wide field of view, as discussed above, to retro-reflect all images of the detector 160 in all wavelengths within the spectral bandpass of the spectrometer, as formed through the dispersive element 140. As a result, the in-band view of the detector 160 through the dispersive element 140 is a focused f-cone that is normally incident on the flat reflective surface of the slit substrate 120 (i.e., the rays are substantially perpendicular to the planar surface of the slit substrate). Thus, the in-band view of the detector is retro-reflected back into the cryogenic dewar housing the detector 160, as discussed above.

Therefore, although the detector 160 may be able to see off slit, as discussed above, because the off-slit view is retro-reflected into the cryogenic dewar, the associated thermal noise may be minimal. In one example, the infrared background noise is limited to that produced by the mirrors and lenses in the optical path, which are by design highly transmissive within the spectrometer bandpass. These mirrors and lenses, including the reflective surface of the slit substrate 120 which acts as a mirror, may include anti-reflection coatings for high transmission and low emissivity, and may therefore provide only negligible contributions to the infrared background noise even at ambient temperatures. As a result of the arrangement and configuration of the mirrors and lenses in the optical path, the detector 160 will not see any surface (optical or structural) that has a high emissivity. Accordingly, unlike in conventional systems in which all components on the detector side of the slit must generally be kept cold, the optical components between the detector 160 and the slit may be at ambient temperature and need not be housed within a cryogenic dewar. This may provide significant benefits, including that a small and relatively inexpensive cryogenic dewar may be used since it may house only the detector sub-system. In one example, the detector 160 may be included in a standard tactical focal plane array dewar. The use of a standard tactical focal plane array dewar may provide a significant cost benefit over conventional systems that require large cryogenic dewars capable of housing bulky optical components.

In the example illustrated in FIG. 1, the slit substrate 120 has a single slit that allows a single stream of photons through to be spectrally dispersed over the detector 160 by the dispersive element 140. In one example of a long-wavelength infrared (LWIR) spectrometer 100, the dispersive element 140 is a blazed diffraction grating having a 16.5 micrometer (μm) grating period. In this example, the detector 160 includes a two-dimensional focal plane array detector, and 480 detector pixels are used to image the slit. In this example, the slit substrate 120 acts as an efficient narcissus mirror for substantially all in-band wavelengths (e.g., wavelengths in the range of about 8-12 μm) along optical paths from the detector 160 through the diffraction grating and through the collimator optic 130.

Figure 3:
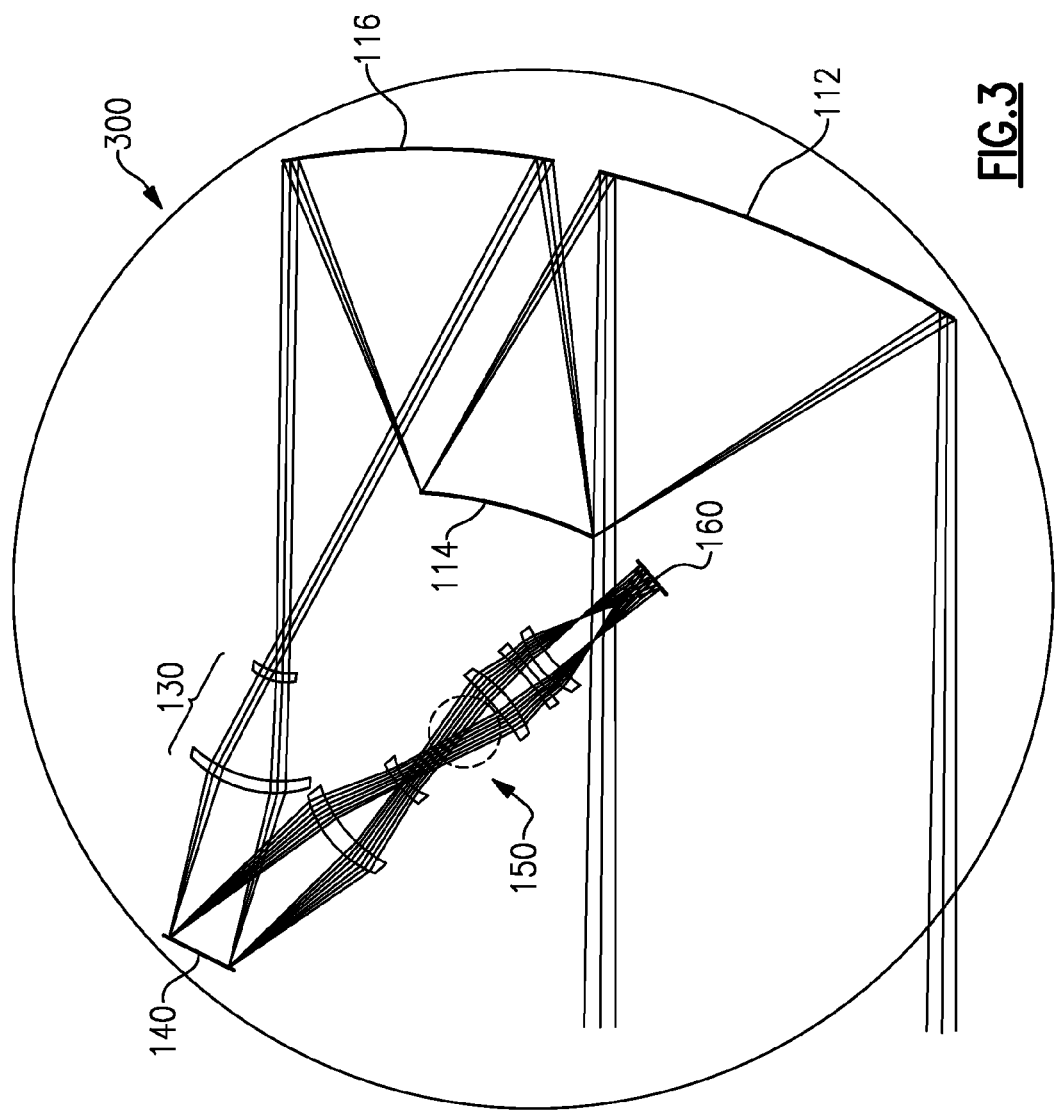
FIG. 3 is a schematic diagram of another example of a dispersive interferometer according to aspects of the invention.

As discussed above, the slit substrate 120 may define more than one slit. For example, referring to FIG. 3 there is illustrated an example of an optical path for a spectrometer 300 having a slit substrate (not shown) that defines three slits. In this example, the dispersive element 140 includes a brazed diffraction grating having a grating period of 60 μm. In this example, the detector 160 includes a two-dimensional focal plane array sensor with each slit using 120 pixels on the detector. In this example, for an LWIR spectrometer, the slit substrate similarly acts as an efficient narcissus mirror for substantially all in-band wavelengths (e.g., wavelengths in the range of about 8-12 μm) along optical paths from the detector 160 through the diffraction grating 140 and through the collimator optic 130.

Thus, according to various aspects and embodiments, a dispersive spectrometer, for example, an infrared, optionally an LWIR, dispersive spectrometer may be configured such that for substantially all in-band wavelengths, the field of view of the detector is retro-reflected back into the dewar and therefore does not "see" warm (or ambient) components with high emissivity that could contribute significantly to infrared background noise. As a result, only a minimum number of the optical components, for example, the detector subsystem, may be housed within a cold/cryogenic dewar and the remainder of the optical components may be at ambient temperature during operation of the spectrometer. As discussed above, this configuration may provide significant cost benefits, since a standard tactical dewar or other small, inexpensive dewar may be used for the detector subsystem, and the need to cool large, bulky optical components (such as lenses and mirrors) may be avoided.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:
1. A dispersive infrared spectrometer comprising:
a substrate defining at least one slit, the substrate having a first reflective surface;
telecentric flat-field foreoptics configured to direct light rays through the at least one slit;
a telecentric flat-field collimator positioned facing the first reflective surface of the substrate and configured to collimate the light rays from the at least one slit to provide collimated light rays;
a dispersive element optically coupled to the telecentric flat-field collimator, the telecentric flat-field collimator being positioned between the substrate and the dispersive element, the dispersive element configured to receive and spectrally disperse the collimated light rays to provide dispersed light;
a detector housed within a cryogenic dewar; and
a flat-field relayed imager positioned between the dispersive element and the detector and configured to receive the dispersed light from the dispersive element and to image the dispersed light onto the detector;
wherein the substrate, the telecentric flat-field foreoptics, the dispersive element, the telecentric flat-field collimator and the flat-field relayed imager are located outside the cryogenic dewar and, during operation of the spectrometer, are at ambient temperature.

2. The dispersive infrared spectrometer of claim 1, wherein the dispersive element is a diffraction grating.

3. The dispersive infrared spectrometer of claim 1, wherein the dispersive element is a prism.

4. The dispersive infrared spectrometer of claim 1, wherein the detector is a two-dimensional focal plane array sensor.

5. The dispersive infrared spectrometer of claim 4, wherein the first reflective surface of the substrate is substantially planar.

6. The dispersive infrared spectrometer of claim 5, wherein the first reflective surface of the substrate is a narcissus mirror configured to retro-reflect substantially all in-band wavelengths of light to the detector.

7. The dispersive infrared spectrometer of claim 6, wherein the in-band wavelengths include wavelengths in a range of approximately 8 to 12 micrometers.

8. The dispersive infrared spectrometer of claim 1, wherein the telecentric flat-field foreoptics includes:
 a primary minor configured to receive incident light rays and to reflect the light rays;
 a secondary mirror optically coupled to the primary mirror and configured to receive the light rays reflected from the primary minor and to reflect the light rays; and
 a tertiary minor optically coupled to the secondary mirror and configured to receive the light rays reflected from the secondary minor and to reflect and focus the light rays at the at least one slit in the substrate.

9. The dispersive infrared spectrometer of claim 1, wherein the telecentric flat-field collimator is configured to collimate the light rays into a circular beam that is incident on the dispersive element.

10. A method of controlling thermal noise in an infrared spectrometer, the method comprising:
 providing a cryogenic dewar containing a detector;
 providing a substrate defining at least one slit and having a planar reflective mirror surface, the substrate being located outside of the cryogenic dewar; and
 retro-reflecting a field of view of the detector from the reflective minor surface through a dispersive element and a telecentric collimator positioned between the substrate and the dispersive element into the cryogenic dewar, the dispersive element and the telecentric collimator being located outside of the cryogenic dewar.

11. The method of claim 10, wherein retro-reflecting the field of view of the detector includes retro-reflecting light in the long-wavelength infrared spectral band.

12. The method of claim 10, further comprising:
 focusing light rays at the at least one slit using telecentric foreoptics;
 collimating the light rays from the slit with the telecentric collimator to provide a collimated beam, and directing the collimated beam to the dispersive element; and
 spectrally dispersing the collimated beam over the detector.

13. The method of claim 12, wherein spectrally dispersing the collimated beam includes providing spectrally dispersed light, and wherein the method further comprises:
 reimaging the spectrally dispersed light from the dispersive element with a relayed imager located outside of the cryogenic dewar and directed the spectrally dispersed light to the detector.

14. The method of claim 12, wherein spectrally dispersing the collimated beam includes spectrally dispersing the collimated beam with a diffraction grating.

15. The method of claim 10, wherein retro-reflecting the field of view of the detector includes retro-reflecting substantially all images of the detector in wavelengths within a spectral bandpass of the infrared spectrometer as formed through the dispersive element.

\* \* \* \* \*

UNITED STATES PATENT AND TRADEMARK OFFICE
CERTIFICATE OF CORRECTION

PATENT NO. : 8,507,866 B2
APPLICATION NO. : 13/324167
DATED : August 13, 2013
INVENTOR(S) : Lacy G. Cook It is certified that error appears in the above-identified patent and that said Letters Patent is hereby corrected as shown below:

In the Claims:

In claim 8, column 7, line 21, "minor" should be --mirror--.

In claim 8, column 7, line 25, "minor" should be --mirror--.

In claim 8, column 7, line 26, "minor" should be --mirror--.

In claim 8, column 7, line 28, "minor" should be --mirror--.

In claim 10, column 8, line 5, "minor" should be --mirror--.

Signed and Sealed this
Twelfth Day of November, 2013

Teresa Stanek Rea
*Deputy Director of the United States Patent and Trademark Office*